United States Patent [19]

Bartlett et al.

[11] Patent Number: 4,905,109

[45] Date of Patent: Feb. 27, 1990

[54] PROCESS FOR OPTIMIZING HEAD POSITION TO OVERCOME DISK MISCLAMPING AND IMPERFECTIONS

[75] Inventors: Kenneth G. Bartlett; Per-Erik Walberg, both of San Jose, Calif.

[73] Assignee: Konica Corporation, Tokyo, Japan

[21] Appl. No.: 137,805

[22] Filed: Dec. 23, 1987

[51] Int. Cl.[4] .......................... G11B 5/54; G11B 5/596
[52] U.S. Cl. .............................. 360/77.02; 360/77.03;
  360/77.08; 360/78.04; 360/78.11; 360/48
[58] Field of Search ........ 360/75, 48, 77.02, 14 77.11,
  360/78.04, 78.08, 78.13, 78.14, 78.11, 109;
  318/685, 696

[56] References Cited

U.S. PATENT DOCUMENTS

| | | | |
|---|---|---|---|
| 4,445,153 | 4/1984 | Fujimoto et al. | 360/77.02 |
| 4,485,418 | 11/1984 | Bremmer | 360/77.02 |
| 4,499,510 | 2/1985 | Harding et al. | 360/77.02 |
| 4,816,938 | 3/1989 | Cowen et al. | 360/75 |

*Primary Examiner*—Alan Faber
*Assistant Examiner*—Steven R. Garland
*Attorney, Agent, or Firm*—Thomas E. Schatzel

[57] ABSTRACT

A process allows a disk drive system to optimize head position in order to minimize the effects of track variations due to disk misclamping and imperfections. The process utilizes a transducer head having a width less than a track width. The small size of the transducer head allows it to be positioned within a stationary band which remains within the boundaries of the track for the complete revolution of the disk. Once the head is positioned within this band for one track of the disk, this track can be used as a reference for positioning the head within the bands of the other tracks.

11 Claims, 9 Drawing Sheets

Fig_1

Fig_2

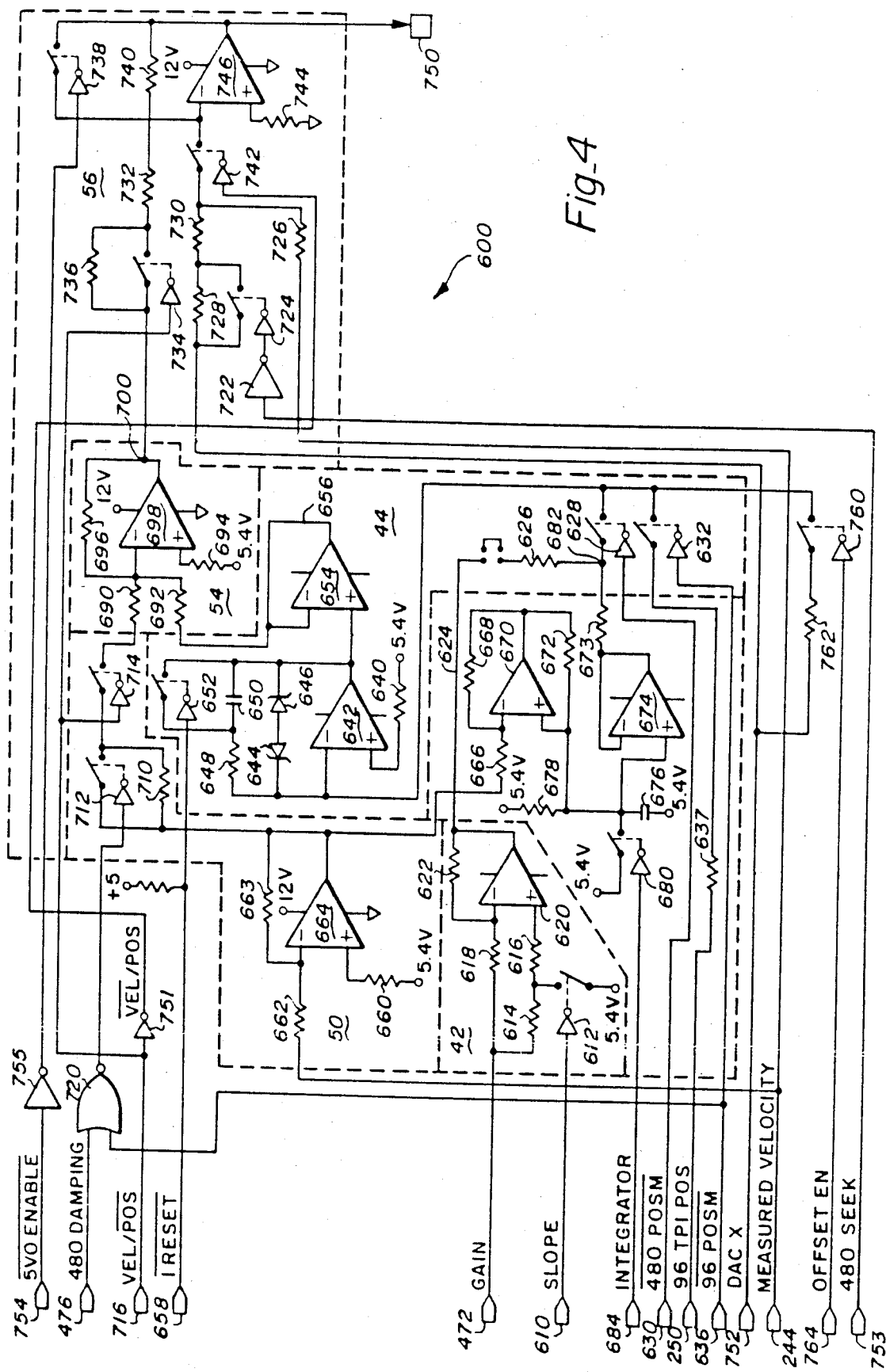

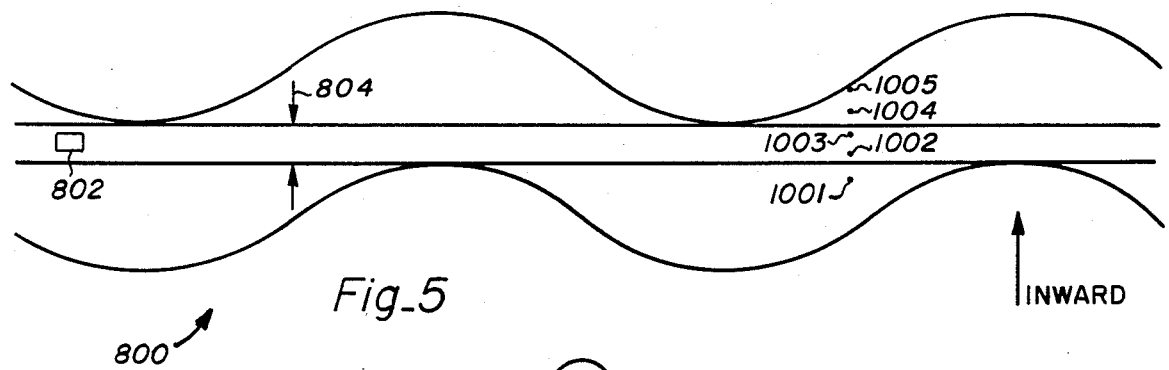
Fig_5
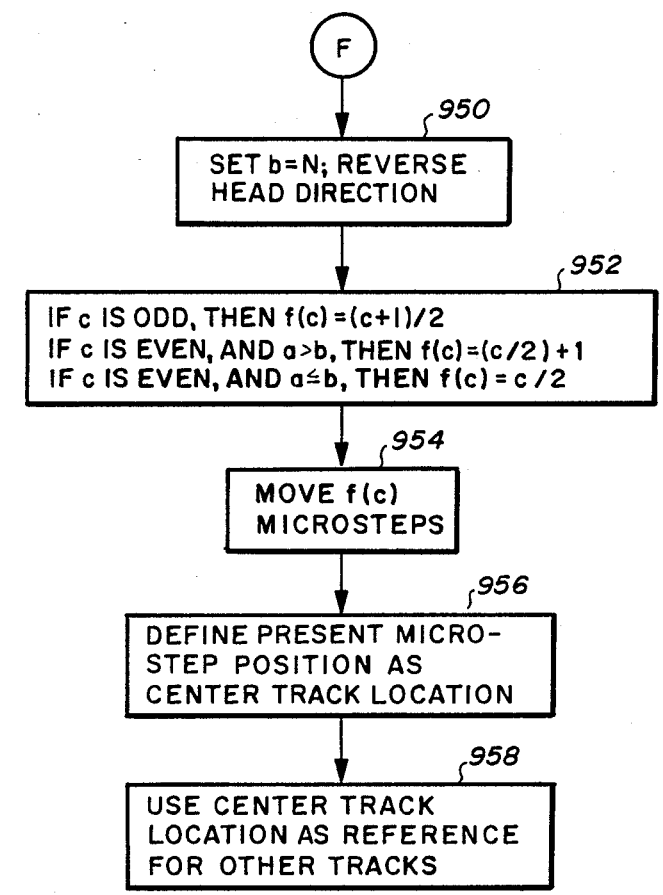
Fig_9
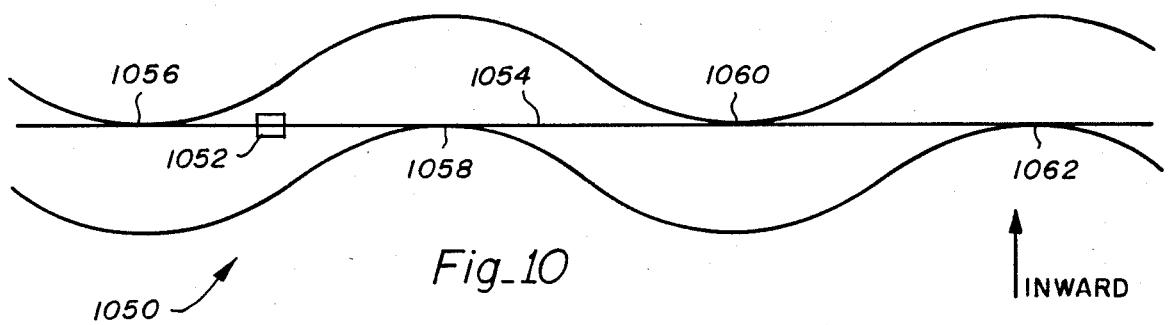
Fig_10

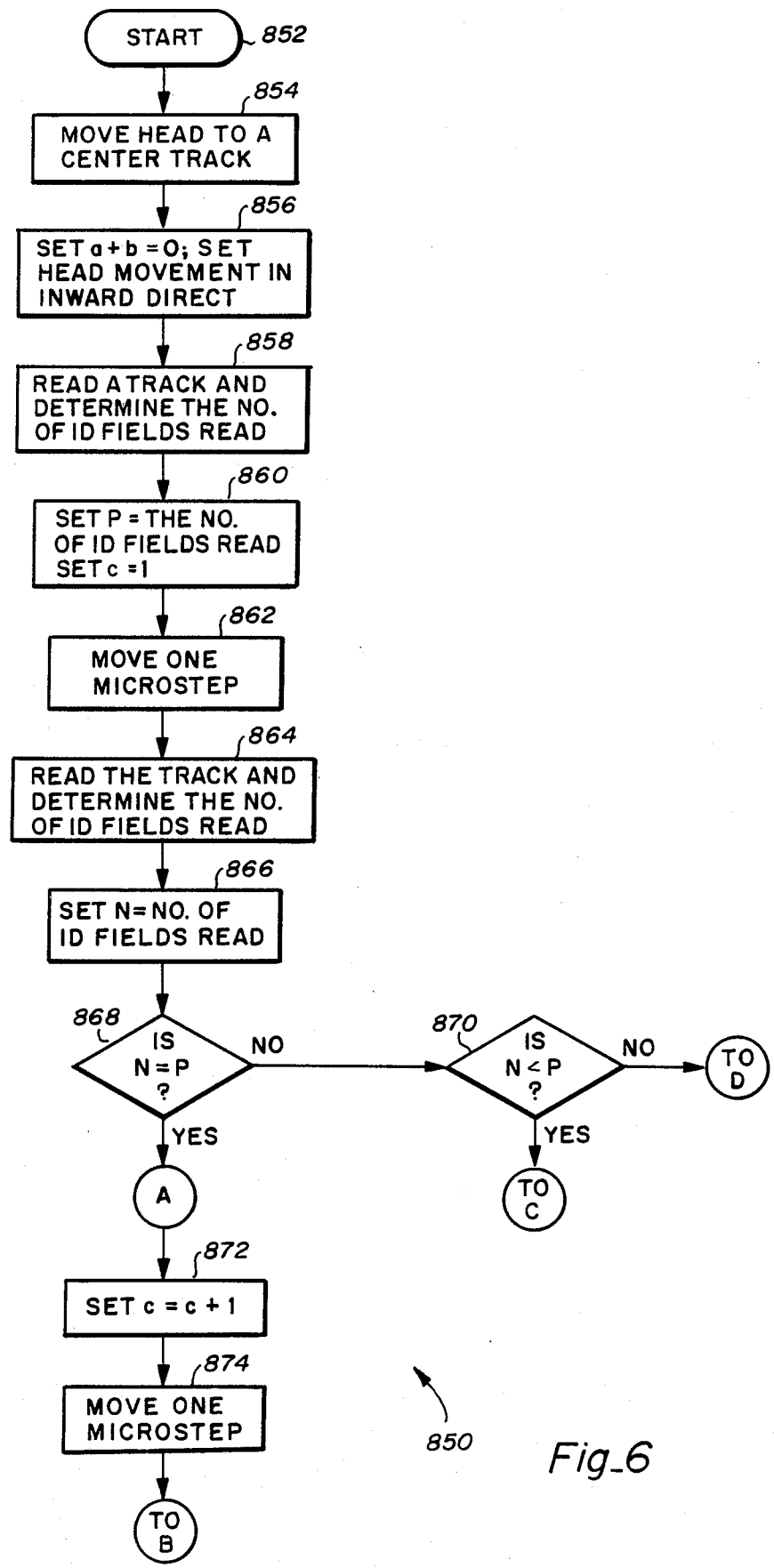
Fig_6

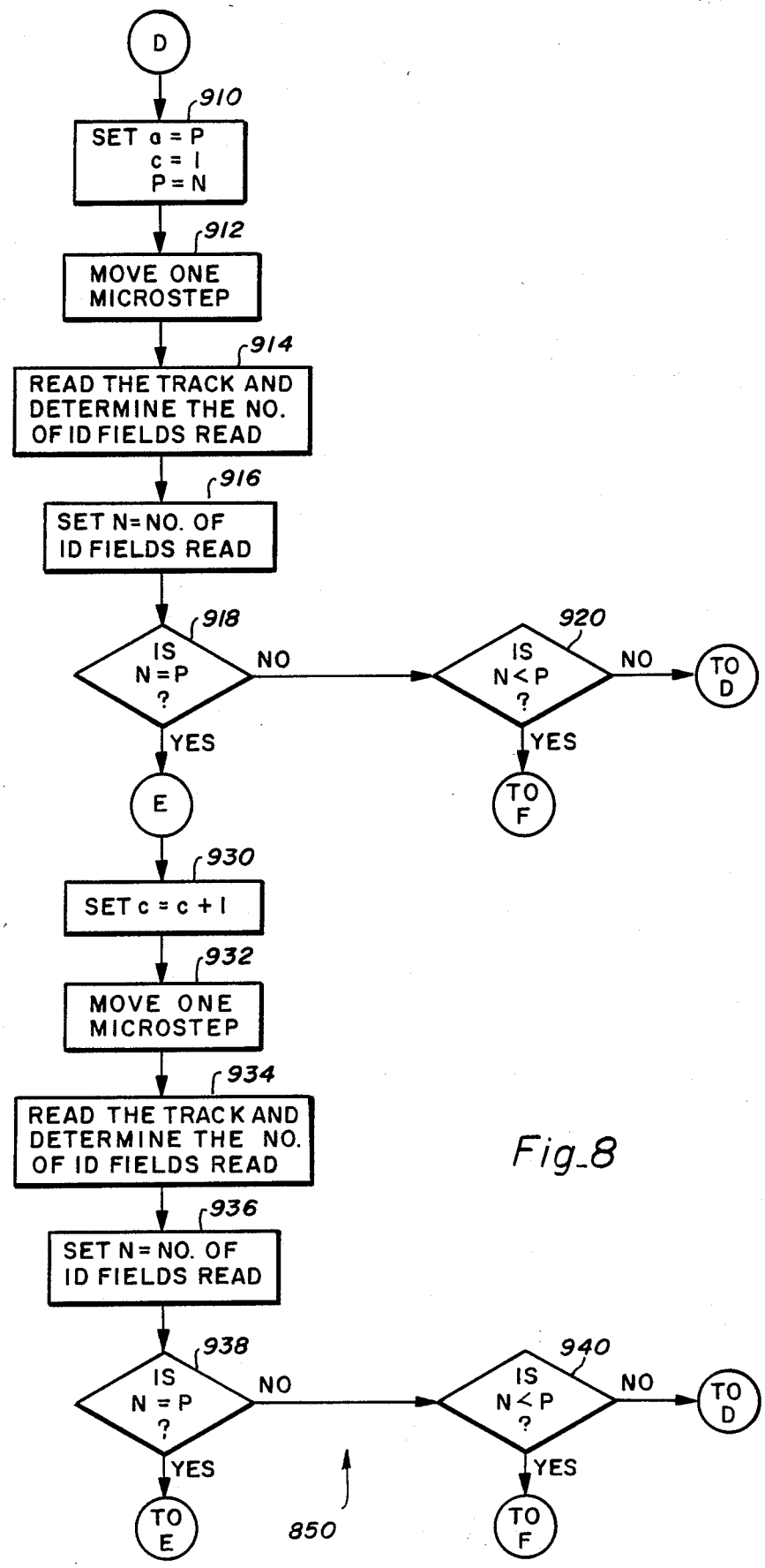

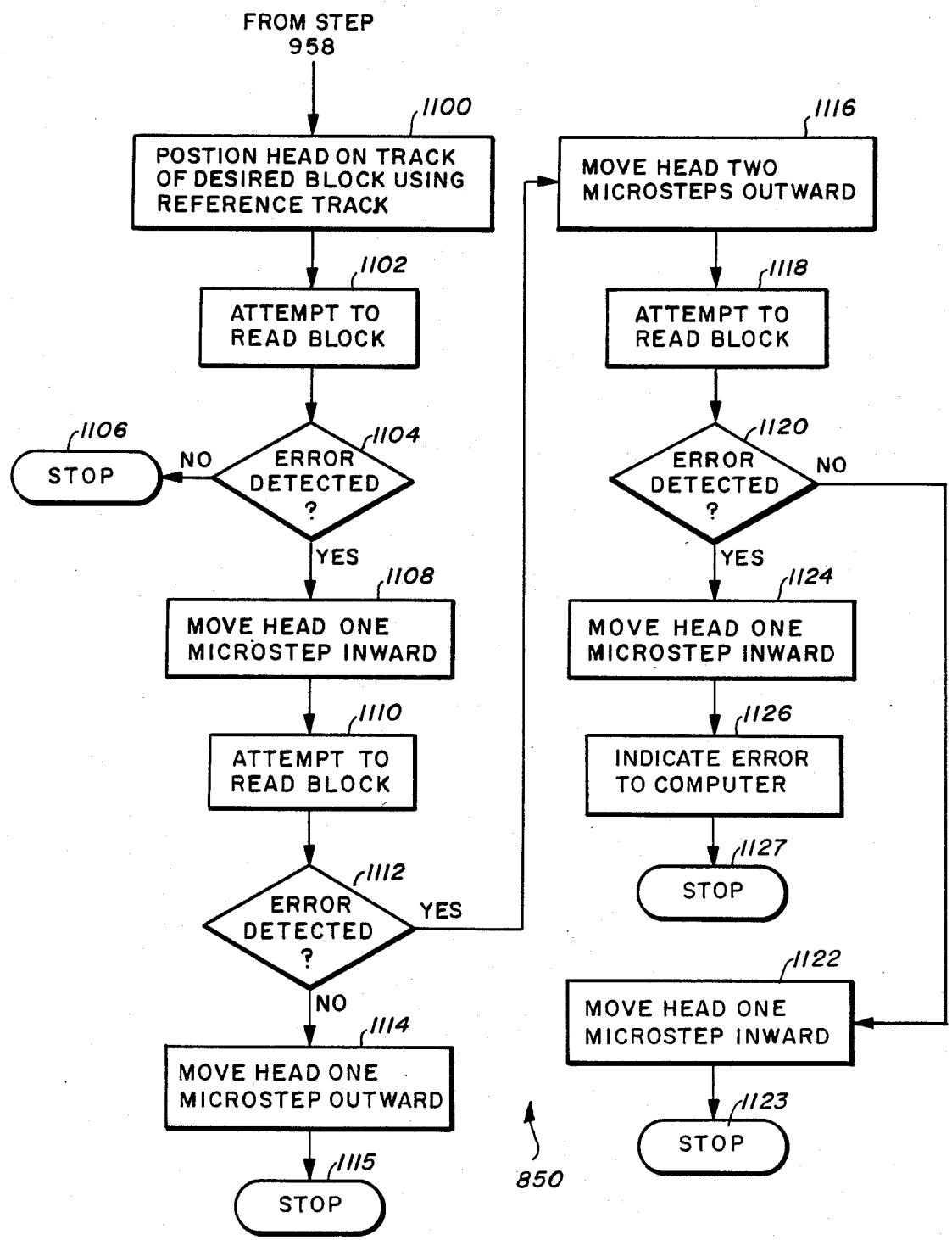
Fig_11

PROCESS FOR OPTIMIZING HEAD POSITION TO OVERCOME DISK MISCLAMPING AND IMPERFECTIONS

BACKGROUND OF THE INVENTION

1. Field of the Invention

This invention relates generally to disk drive systems and more particularly to processes for achieving optimum head position in order to overcome problems of disk misclamping and imperfections.

2. Description of the Prior Art

In electronic computer technology, it is common to store data in binary form on the face of a rotatable disk. The face of the disk is coated with a magnetizable substance such as iron oxide. The disks are operated by rotating them like phonograph records and the binary data is retrieved from the face of the disk by a movable magnetic transducer device called a read/write or transducer head. The binary information is encoded on the face of the disk in concentric rings, called tracks, and the read/write head can move radially along the disk face to select a particular track from which to retrieve information. Data disks can be rigid or flexible.

The flexible disks have some inherent problems. When the flexible disk is inserted into a disk drive, the disks may be misclamped at a point which is off center. This creates a once per revolution variation in the position of the track and prevents the head from accurately following the track. Similarly, humidity and temperature changes can elongate the disk and cause a twice per revolution track variation. There is a need for a process for enabling a disk drive to locate the head at an optimum position in order to read the disk under these conditions.

SUMMARY OF THE PRESENT INVENTION

It is an object of the present invention to provide a process for overcoming problems of disk misclamping and imperfections.

It is another object of the present invention to provide a process which enables a transducer head to remain completely within the boundaries of a data track.

Briefly, in a preferred embodiment, the present invention provides a process comprising the steps of: (a) positioning a head on a center track of a disk, said head having a width considerably less than a track width; (b) repeatedly reading said track and microstepping said head in a first direction across said track until the number of identification fields detected is decreasing; (c) defining the preceding microstep position as a current maximum location; (d) moving the head to a microstep position on the other side of said current maximum location and reading the track; (e) if the number of identification fields read in step (d) is less than the number of identification fields read at the current maximum location, then defining the current maximum location as an optimum location and terminating the process; (f) if the number of identification fields read in step (d) is greater than or equal to the number of identification fields read at the current maximum location, then repeatedly reading said track and microstepping the head in a second direction across said track until the number of identification fields detected is decreasing; and (g) defining the preceding track location as an optimum track location.

An advantage of the present invention is that it provides a process for overcoming problems of disk misclamping and eccentricities.

Another advantage of the present invention is that it provides a process which enables a disk drive to position a head such that the head remains completely within the boundaries of a data track while the track is being read.

These and other objects and advantages of the present invention will no doubt become obvious to those of ordinary skill in the art after having read the following detailed description of the preferred embodiment which is illustrated in the various drawing figures.

IN THE DRAWINGS

FIG. 4 is a circuit diagram of a third part of the system of FIG. 1;

FIG. 5 is a schematic of a disk track as seen from a transducer head;

FIG. 6 is a first portion of a flow chart of the process of the present invention;

FIG. 8 is a third portion of a flow chart of the process of the present invention;

FIG. 9 is a fourth portion of a flow chart of the process of the present invention;

FIG. 10 is a schematic of a second disk track as seen from a transducer head; and FIG. 11 is a fifth portion of a flow chart of the process of the present invention.

DETAILED DESCRIPTION OF THE PREFERRED EMBODIMENT

Figure 1:
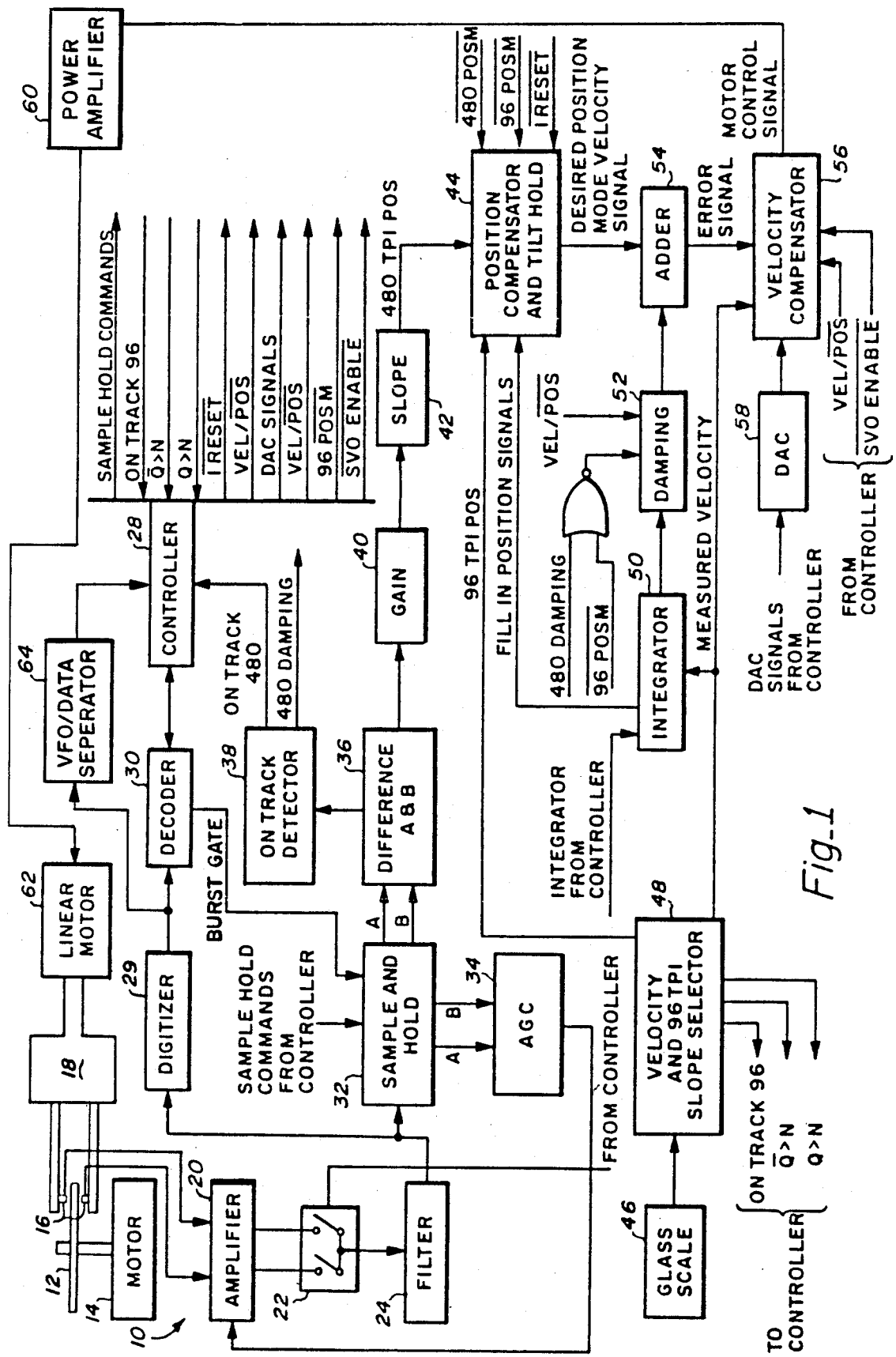
FIG. 1 is a circuit block diagram of a disk drive system of the present invention.

FIG. 1 shows a circuit block diagram of the disk drive system of the present invention and is designated by the general reference number 10. System 10 is able to read four hundred eighty tracks per inch (TPI) disks having embedded servo information as well as forty-eight and ninety-six TPI disk. See the co-pending U.S. Patent Application for a "Process For Identifying Disks and Automatically Configuring A Disk Drive System", by the same inventors U.S. patent application Ser. No. 07/137,804, filed Dec. 23, 1987. A flexible or floppy data disk 12 is rotated by a motor 14. A pair of transducer heads 16 are positioned over the surface of the disk 12 and are attached to a carriage arm 18.

An amplifier 20 is connected to the transducer heads 16 and amplifies the signals from the heads 16. A switch 22 is connected to amplifier 20 and controls which head signals are to be used. A filter 24 is connected to switch 22 and provides filtering for the head signals. Switch 22 is controlled by a controller 28.

A digitizer 29 is connected to filter 24 and digitizes the analog head signals. A decoder 30 is connected to digitizer 29 and reads the digitized head signals in a servo sector of a four hundred eighty TPI disk and generates timing windows for reading the servo information. These timing windows are sent to the controller 28. A sample and hold circuit 32 is connected to filter 24 and stores the "A" and "B" servo bursts read by heads 16. An automatic gain control (AGC) 34 is connected to the sample and hold circuit 32. AGC 34 measures the intensity of the sampled "A" and "B" servo bursts and sends an AGC control signal to the amplifier 20 to adjust the gain.

A difference circuit 36 is connected to the sample and hold circuit 32 and produces a signal corresponding to the difference in intensities of the sampled "A" and "B" servo bursts. An on-track detector 38 is connected to the difference circuit 36. On-track detector 38 determines from the difference signal whether the head is on-track or not, and sends an on-track signal to controller 28.

A gain circuit 40 is connected to difference circuit 36 and modifies the gain of the difference signal to compensate for misclamping and disk imperfections. A slope circuit 42 is connected to gain circuit 40 and selects the slope of the signal from the gain circuit 40 in order to produce a four hundred eighty TPI position signal. A position compensator and tilt hold circuit 44 is connected to the slope circuit 42 and outputs a desired position mode velocity signal which also compensates for tilt.

An etched metal plate scale 46, also called a linear optical encoder, is attached to the carriage 18 and provides output signals responsive to the movement of the carriage 18. A glass scale could be used in place of the metal scale 46. A velocity and ninety-six TPI slope select circuit 48 is connected to the metal scale 46. Velocity and ninety-six TPI slope select circuit 48 produces a ninety-six TPI position signal and a measured velocity signal. An integrator 50 is connected to velocity and ninety-six TPI slope selector circuit 48 and position compensator 44 and integrates the measured velocity signal to produce a fill-in position signal. The fill-in position signal is added to the four hundred eighty TPI position signal in the position compensator 44. A damping circuit 52 is connected to the integrator 50. The damping circuit 52 damps the measured velocity signal transmitted to the adder 54 when the on-track detector 38 indicates the heads 16 are on-track. A summing amplifier or adder 54 is connected to the damping circuit 52 and the position compensator and tilt hold circuits 44 and compares the desired position mode velocity position signal to the measured velocity signal and produces an error signal.

A velocity compensator 56 is connected to the adder 54, velocity circuit 48 and a digital-to-analog converter (DAC) 58. The velocity compensator 56 produces a motor control signal and sends it to a power amplifier 60 which in turn controls a linear motor 62. Linear motor 62 is a linear voice coil motor. Linear motor 62 moves carriage 18 and determines radial position of heads 16 relative to disk 12.

A variable frequency oscillator/data separator 64 is connected between digitizer 29 and controller 28. Separator 64 enables controller 28 to read the logic data stored on the disk.

The operation of system 10 has three modes: a velocity or seek mode, a ninety-six TPI position mode and a four hundred eighty TPI position mode. The ninety-six TPI position mode can also be used with forty-eight TPI disks. The controller 28 merely doubles the number of tracks moved when positioning on a forty-eight TPI disk. The system 10 can thus be used with forty-eight, ninety-six and four hundred eighty TPI type disks.

The velocity or seek mode is well known in the art. The controller 28 knows the position of heads 16 on disk 12. When a new track is desired, the controller inputs a desired velocity signal to the DAC 58. The DAC 58 turns the digitized desired velocity signal into an analog signal. This desired velocity signal is then passed to the velocity compensator 56 which causes the linear motor 62 to move the heads 16.

The metal scale 46 and the velocity circuit 48 produce a measured velocity signal. The velocity compensator 56 compares the measured velocity signal with the desired velocity signal from the DAC 58. The velocity compensator 56 trys to keep the measured velocity equal to the desired velocity by adjusting the motor control signal accordingly. The rest of the circuits in the system 10 remain inactive during the seek mode.

Once the heads are on the proper track, the system 10 must keep the heads 16 on-track as the disk 12 is rotated by motor 14. This on-track function is performed by the position modes. The ninety-six TPI position mode is used when a forty-eight or ninety-six TPI disk is being used and the four hundred eighty TPI position mode is used when a four hundred eighty TPI disk is being used.

In the ninety-six TPI position mode, the velocity and ninety-six TPI slope selector 48 sends a ninety-six TPI position signal to the position compensator 44. The ninety-six TPI position signal represents the position of heads 16 on the disk 12 as measured by the metal scale 46. The position compensator 44 sends a desired position mode velocity signal to the adder 54. The adder 54 compares the desired position mode velocity signal with the measured velocity signal and trys to keep them equal by outputting the proper error signal. The adder 54 passes the error signal to the velocity compensator 56. The velocity compensator 56 outputs the motor control signal to the power amp 60 and the linear motor 62.

When a four hundred eighty TPI disk is used, the tracks are much closer together and keeping the heads 16 on-track becomes more difficult. A metal scale position signal, as used in the ninety-six TPI position mode, is not accurate enough to use in a four hundred eighty TPI disk. Therefore, the four hundred eighty TPI position mode of the system uses a periodic sampling of servo sector information.

In the four hundred eighty TPI position mode, the sample and hold circuit 32 receives and stores the "A" and "B" servo bursts which are read from the servo pattern on disk 12. The burst gate timing windows needed to read the bursts are provided by decoder 30. The difference circuit 36 determines the difference in intensity of the "A" and "B" bursts. The gain circuit 40 modifies the signal from the difference circuit 36 to compensate for misclamping and disk imperfections. The slope circuit 42 selects the slope of the signal and produces a four hundred eighty TPI position signal. The position compensator 44 modifies the four hundred eighty TPI position signal and produces a desired position mode velocity signal.

When a servo sector is being read, the integrator 50 is disabled and the fill-in position signal is zero. The desired position mode velocity signal from the position compensator 44 is thus equivalent to the four hundred eighty TPI position signal. The adder 54 compares the measured velocity and the desired position mode velocity signal from the position compensator 44 and produces an error signal. The velocity compensator 56 produces a motor control signal which goes to motor 62 via power amplifier 60. The motor moves the heads 16 to keep them on track.

When the heads 16 are between servo sectors, the servo system 10 is unable to receive position information from the disk 12. Older disk drive systems try to hold the head on-track between servo samples based on the information stored from the last servo sector which was read. The present system is able to produce a position signal between servo sectors. The integrator 50 is used to integrated the measured velocity signal to produce a fill-in position signal. This fill-in position signal is passed to the position compensator 44 and is there added to the four hundred eighty TPI position signal of the last servo sector which was read. The sample position signal is derived from the "A" and "B" burst signals from the preceding servo sector reading and is stored in the sample and hold circuit 32. Thus, the integrator 50 gives the system 10 position information between servo sector samples and allows accurate adjustment of the head position between samples. This integrated velocity position signal is a unique way to supplement the position information from the servo sectors and provides a more accurate way to keep the heads on-track.

Figure 2:
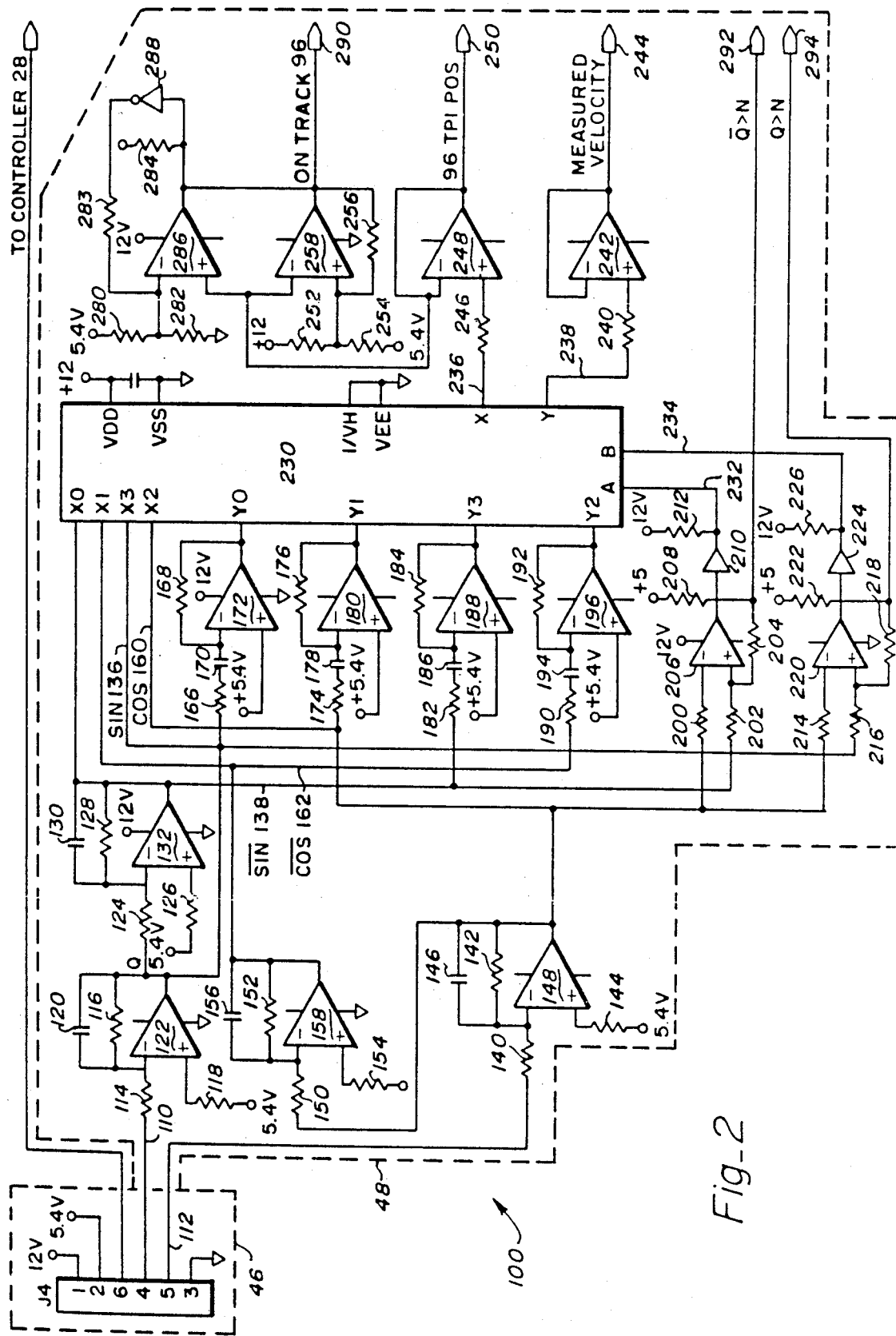
FIG. 2 is a circuit diagram of a first part of the system of FIG. 1.

FIG. 2 shows a circuit diagram of a first part of the system 10 of FIG. 1 and is designated by the general reference number 100. Part 100 includes the metal scale 46 and the velocity and ninety-six TPI slope selector 48. The metal scale 46 measures movement of the heads 16. When the heads 16 are positioned over the first track of the disk 12, the metal scale puts out a track zero signal to controller 28. The metal scale produces a pair of signals which are two triangular waves in quadrature (90° apart) and are hereinafter referred to as a sine wave and a cosine wave, respectively. The metal scale produces the sine wave signal on a line 110 and the cosine wave signal on a line 112. The sine and cosine waves represent the position of the heads 16 on disk 12.

The sine wave on line 110 is passed through a buffer network comprised of a resistor 114, a resistor 116, a resistor 118, a capacitor 120, and an amplifier 122. The buffered sine wave is then passed through an inverting network comprised of a resistor 124, a resistor 126, a resistor 128, a capacitor 130, and an amplifier 132. The resulting buffered sine and inverted sine waves are output on a line 136 and 138, respectively.

The cosine wave on line 112 is passed through a buffer network comprised of a resistor 140, a resistor 142, a resistor 144, a capacitor 146, and an amplifier 148. The buffered cosine wave is then passed through an inverting network comprised of a resistor 150, a resistor 152, a resistor 154, a capacitor 156, and an amplifier 158. The resulting buffered cosine and inverted cosine waves are output on a line 160 and 162, respectively.

The sine wave from line 136 is differentiated by a differentiating network comprised of a resistor 166, a resistor 168, a capacitor 170, and an amplifier 172. The cosine wave from line 160 is differentiated by a differentiating network comprised of a resistor 174, a resistor 176, a capacitor 178 and an amplifier 180. The inverse sine wave from line 138 is differentiated by a differentiating network comprised of a resistor 182, a resistor 184, a capacitor 186, and an amplifier 188. The inverse cosine wave from line 162 is differentiated by a differentiating network comprised of a resistor 190, a resistor 192, a capacitor 194, and an amplifier 196.

The cosine wave from line 160 and the sine wave from line 138 are digitized by a network comprised of a resistor 200, a resistor 202, a resistor 204, an amplifier 206, a resistor 208, an amplifier 210, and a resistor 212.

The sine wave from line 136 and the cosine wave from line 160 are digitized by a network comprised of a resistor 214, a resistor 216, a resistor 218, an amplifier 220, a resistor 222, an amplifier 224, and a resistor 226.

A double four-to-one multiplexer 230 provides wave selection for both the measured velocity and ninety-six TPI position signals. The multiplexer 230 receives binary signals along a line 232 and a line 234. The two binary signals represent four possible combinations representing one of the four waves. The multiplexer 230 receives the sine, cosine, inverse sine and inverse cosine waves along lines 136, 160, 138 and 162, respectively. The multiplexer 230 has internal switches which switch one of the four waves to a line 236. The wave selected is the one which is not at a peak and is determined by the binary information along line 232 and 234.

The multiplexer 230 also receives the differentiated sine, cosine, inverted sine and inverted cosine waves. The multiplexer 230 internally selects one of the four waves based upon the binary information from lines 232 and 234 and outputs the selective wave on a line 238. This wave is passed through a buffer comprised of a resistor 240 and an amplifier 242 and is output as the measured velocity signal at a point 244.

The signal on line 236 is passed through a buffer comprised of a resistor 246 and an amplifier 248. The resulting signal is output at a point 250 as the ninety-six TPI position signal. The ninety-six TPI position signal is also passed through a ninety-six TPI on-track detector. The detector includes a high voltage comparator comprised of a resistor 252, a resistor 254, a resistor 256, and an amplifier 258 and a low voltage comparator comprised of a resistor 280, a resistor 282, a resistor 283, a resistor 284, an amplifier 286 and a diode 288. If the ninety-six TPI signal is between a predetermined high and low voltage, then a positive signal is output at a point 290 indicating that the heads 16 are on-track in the ninety-six TPI position mode. This signal then goes to controller 28. The signals on a line 292 and a line 294 are used by controller 28 to detect track crossings.

Figure 3:
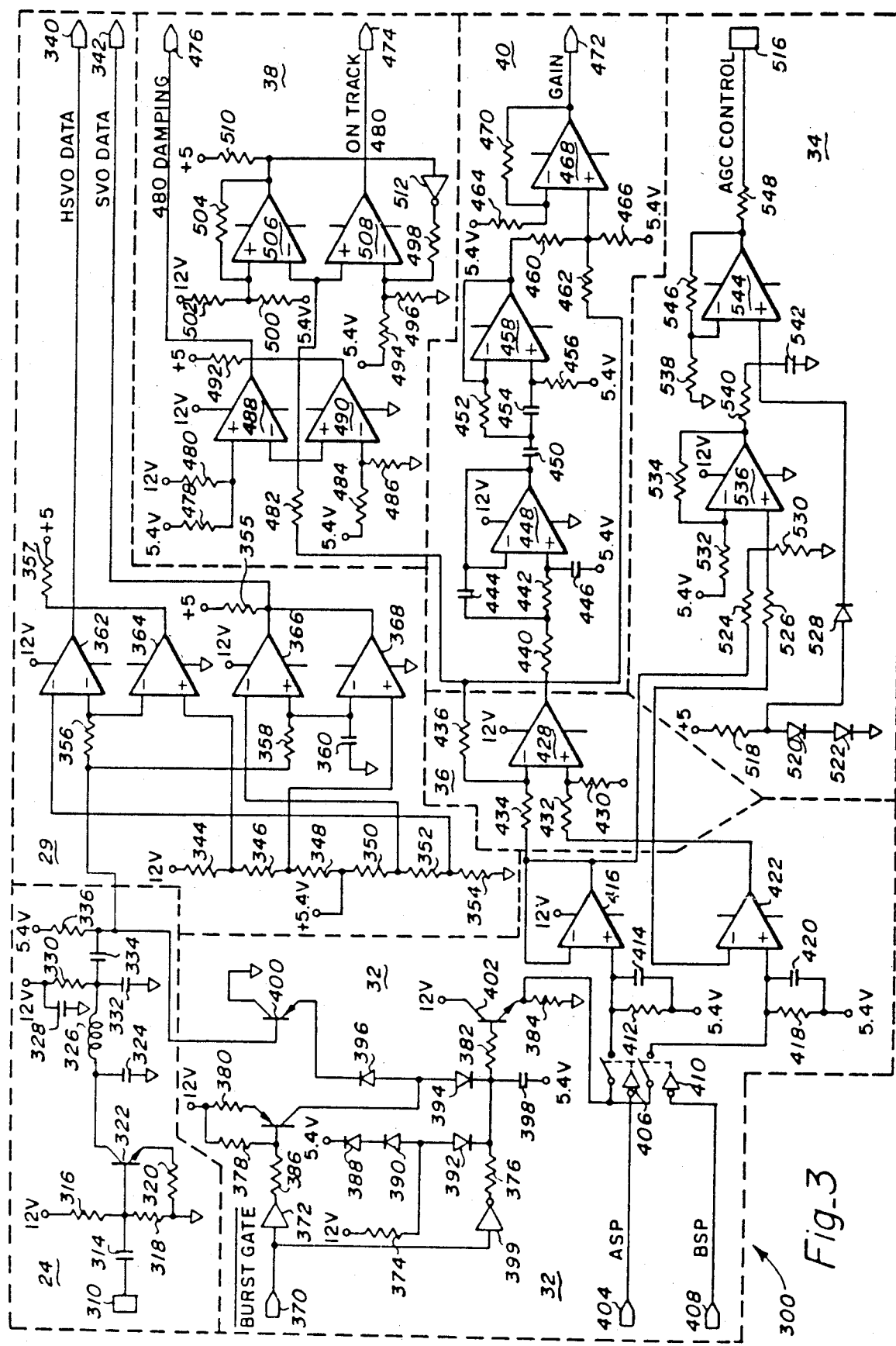
FIG. 3 is a circuit diagram of a second part of the system of FIG. 1.
Figure 7:
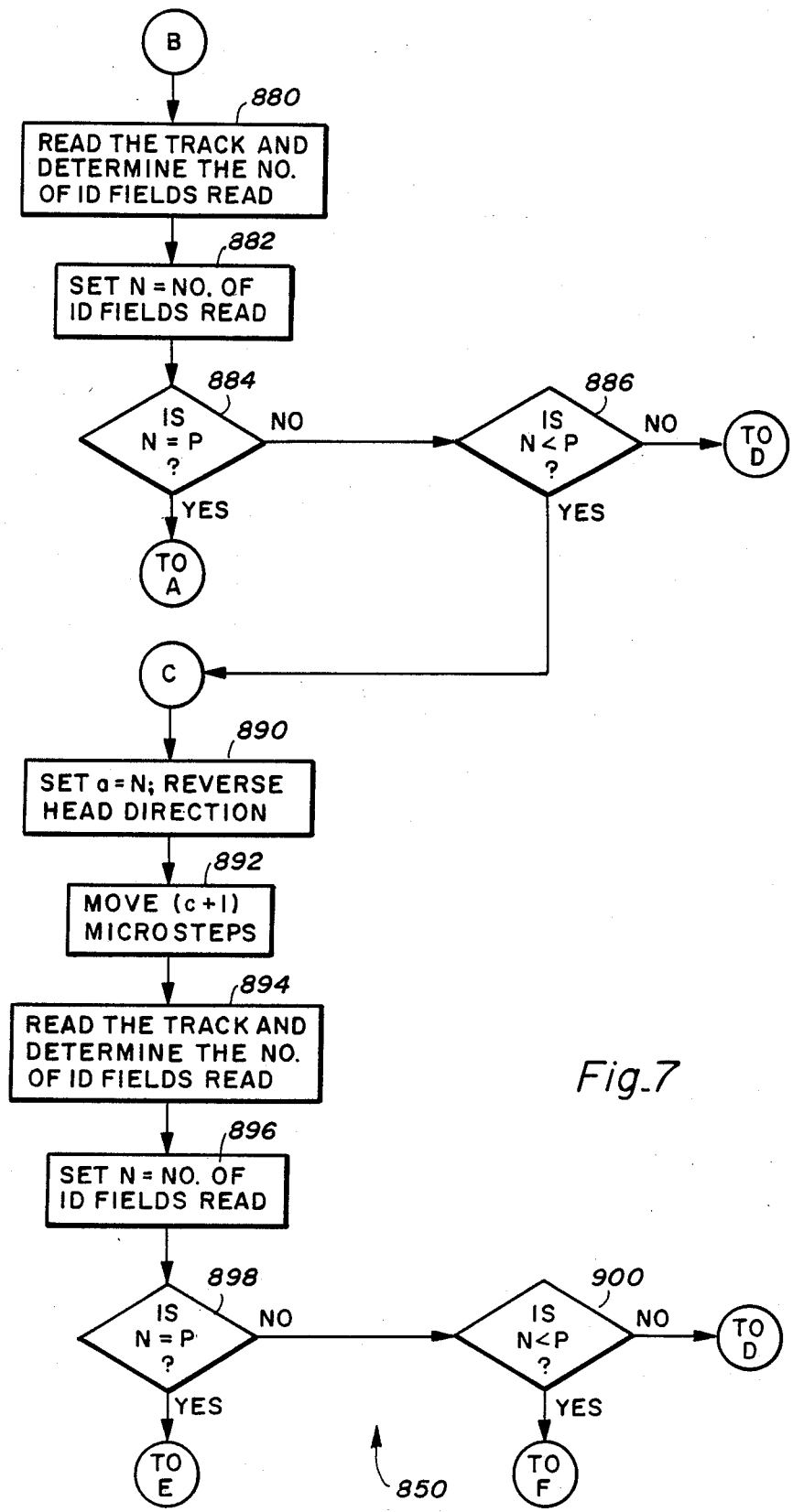
FIG. 7 is a second portion of a flow chart of the process of the present invention.

FIG. 3 is a circuit diagram of part of the system 10 and is designated by the general reference number 300. A point 310 receives the servo information read by heads 16 from switch 22. The servo information is filtered by filter 24. Filter 24 is comprised of a capacitor 314, a resistor 316, a resistor 318, a resistor 320, a transistor 322, a capacitor 324, an inductor 326, a capacitor 328, a resistor 330, a capacitor 332, a capacitor 334, and a resistor 336.

The digitizer 29 receives the servo information from filter 24 and digitizes the signal for the decoder 30. The digitizer 28 puts out a high threshold signal to a point 340 and a low threshold signal to a point 342. The decoder 30 uses the high threshold signal from point 342 when reading the synchronization servo information used for generating timing windows. An example of a decoder and servo pattern is described in U.S. Pat. No. 4,825,310, issued Apr. 25, 1989. The high threshold signal insures that interference signals are screened out. When the decoder 30 reads the "A" and "B" servo bursts, it uses the low threshold signal at point 342. This is because one of the "A" or "B" bursts will be smaller than the other. In order for the servo signal to produce a digitized signal from digitizer 29, a lower threshold must be used. The digitizer 29 is comprised of a plurality of resistors 344, 346, 348, 350, 352, 354, 356, and 358, a capacitor 360, an amplifier 362, an amplifier 364, an amplifier 366, and an amplifier 368.

The sample and hold circuit 32 receives the timing windows for reading the "A" and "B" sample bursts from a point 370. Timing windows, also called a burst gate, from point 370 controls a switching network. The switching network allows the servo information to pass from the filter 24 to the sample and hold circuit 32 during reading of the servo bursts. The switching network is comprised of a buffer 372, a plurality of resistors 374, 376, 378, 380, 382, 384, and 386, a plurality of diodes 388, 390, 392, 394, and 396, a capacitor 398, an inverter 399, a transistor 400, and a transistor 402.

A point 404 receives an "A" sample signal which controls a switch 406. A point 408 receives a "B" sample signal which controls a switch 410. A network comprised of a resistor 412, a capacitor 414, and an amplifier 416 is used to hold the "A" servo burst signal. A network comprised of a resistor 418, a capacitor 420, and an amplifier 422 is used to hold the "B" servo burst signal. Controller 28 controls switch 406 when an "A" servo burst is being read and closes switch 410 when a "B" servo burst is being read.

Difference circuit 36 receives the "A" and "B" bursts from the sample and hold circuit 32 and determines the difference between the two signals. Difference circuit 36 is comprised of an amplifier 428 and a plurality of resistors 430, 432, 434, and 436.

The gain circuit 40 receives the difference signal from difference circuit 36. The gain circuit 40 boosts the gain of the signal to compensate for imperfections in the disk. An off-center disk has a ten hertz error and a noncircular disk has a twenty hertz error for speeds of six hundred rpms. The gain circuit 40 boosts the gain from ten to twenty hertz without increasing the amplitude or effecting the phase margin of the difference signal. The gain circuit 40 has a low pass filter comprised of a resistor 440, a resistor 442, a capacitor 444, a capacitor 446, and an amplifier 448. A high pass filter is comprised of a capacitor 450, a resistor 452, a capacitor 454, a resistor 456, and an amplifier 458. A summing network is comprised of a resistor 460, a resistor 462, a resistor 464, a resistor 466, an amplifier 468 and a resistor 470. The resulting gain signal is output at a point 472.

The on-track detector 38 receives the difference signal from the difference circuit 36. The on-track detector 38 analyzes the difference signal and if the signal is between a certain high and low voltage threshold, then an on-track four hundred eighty TPI signal is sent to controller 28 from a point 474. The on-track four hundred eighty signal means that the heads 16 are on-track in the four hundred eighty TPI position mode. The on-track detector 38 also determines if the difference signal is between a second high and low voltage threshold and if so, outputs a four hundred eighty damping signal at a point 476. The four hundred eighty damping signal is used to control a damping feature discussed below. The on-track detector 38 is comprised of a resistor 478, a resistor 480, a resistor 482, a resistor 484, a resistor 486, an amplifier 488, an amplifier 490, a resistor 492, a resistor 494, a resistor 496, a resistor 498, a resistor 500, a resistor 502, a resistor 504, an amplifier 506, an amplifier 508, a resistor 510, and an inverter 512.

The AGC 34 averages the "A" and "B" burst signals from the sample and hold circuit 32 and outputs an AGC control signal at a point 516. The AGC control signal is used by the amplifier 20 to adjust the gain of incoming signals. The AGC control 34 is comprised of a resistor 518, a diode 520, a diode 522, a resistor 524, a resistor 526, a diode 528, a resistor 530, a resistor 532, a resistor 534, an amplifier 536, a resistor 538, a resistor 540, a capacitor 542, an amplifier 544, a resistor 546, and a resistor 548.

FIG. 4 shows a circuit diagram of part of the system 10 and is designated by the general reference number 600. The slope circuit 42 receives the gain signal from point 472. The slope circuit 42 selects the slope of the gain signal by inverting one slope of the gain signal wave. The slope to be inverted is determined by controller 28. Controller 28 sends a slope signal to a point 610. Slope signal controls a switch 612 which determines which slope is inverted. For an odd numbered track, controller 28 selects one slope and for an even numbered track, controller 28 selects the other slope. Slope circuit 42 is further comprised of a resistor 614, a resistor 616, a resistor 618, an amplifier 620, and a resistor 622.

The position compensator and tilt hold circuit 44 (position circuit) receives the four hundred eighty TPI position signal from the slope circuit 42 along a line 624. The signal is passed through a resistor 626 and a switch 628. Switch 628 is controlled by an inverse four hundred eighty POSM signal received at a point 630 from controller 28. The four hundred eighty PMOS signal indicates that the system 10 is in the four hundred eighty position mode. If the system 10 were in the ninety-six TPI position mode, switch 628 would be open and switch 632 would be closed. Switch 632 is controlled by an inverse ninety-six POSM signal at a point 636. If the system 10 is in the ninety-six TPI position mode, then the position compensator 44 receives the ninety-six TPI position signal from point 250 via a resistor 637.

The position compensator 44 is further comprised of a resistor 640, an amplifier 642, a diode 644, a diode 646, a resistor 648, a capacitor 650, a switch 652 and an amplifier 654. The position compensator 44 modifies the four hundred eighty TPI position signal from the slope circuit 42 or the ninety-six TPI position signal from the velocity and ninety-six TPI slope selector circuit 48 and modifies them to produce a desired position mode velocity signal at a line 656.

The position compensator 44 also has a tilt hold feature to compensate for tilt of the disk drive. When the disk drive is tilted, more force is required to be exerted by the linear motor 62 to keep the heads 16 on track. Capacitor 650 stores a charge which is a measure of the bias needed to compensate for the tilt. Capacitor 650 is charged during the initial power-up of the system 10 and is used for all three modes of operation. Switch 652 disables the tilt feature by discharging capacitor 650. Switch 652 is controlled by an inverse I-reset signal at a point 658 from controller 28. During operation, the bias on capacitor 650 is normally kept on, even when the system 10 switches between velocity (seek) and position (on-track) modes.

The integrator 50 is comprised of a resistor 660, a resistor 662, a resistor 663, an amplifier 664, a resistor 666, a resistor 668, an amplifier 670, a resistor 672, a resistor 673, an amplifier 674, a capacitor 676, a resistor 678, and a switch 680. The integrator 50 integrates the measured velocity signal from point 244 to provide information of the position movement of the heads 16 between reading of the servo sectors when the system 10 is in the four hundred eighty TPI position mode. These integrated signals are called fill-in position signals. These fill-in position signals are added to the four hundred eighty TPI position signal at a point 682. The fill-in position signal plus the last four hundred eighty TPI position signal from the last servo sector sample reading provides a good approximation of the position of the heads 16. When the servo sector is being read, the four hundred eighty TPI position signal gives the actual present location of the heads 16 and the fill-in position signal is not needed. So when the servo sector is being read, the controller 28 sends an integrator signal to a point 684 which closes switch 680 and discharges capacitor 676 and thereby disables the integrator 50.

The adder 54 is comprised of a resistor 690, a resistor 692, a resistor 694, a resistor 696 and an amplifier 698. The adder 54 takes the desired position mode velocity signal from the position compensator 44 and compares it to the measured velocity signal from the damping circuit 52. The adder 54 trys to keep the measured velocity signal equal to the desired position mode velocity by outputting an appropriate error signal at a point 700.

The damping circuit 52 is comprised of a resistor 710, a switch 712 and a switch 714. During the velocity mode, controller 28 puts out a velocity/inverse position signal at a point 716. This causes switch 714 to open and prevents the measured velocity signal from reaching adder 54. The switch 714 remains closed during a position mode.

The damping circuit 52 has a damping feature. As stated above, the adder 54 puts out an error signal which trys to equalize the measured velocity and the desired position mode velocity. However, if the heads 16 are already close to being on-track, then moving them to correct the position may cause the heads to overshoot the track. So if the heads 16 are close to being on-track, the four hundred eighty damping signal from point 476 will cause switch 712 to close and the system 10 will be overdamped. If the heads 16 are very far from the track, then the four hundred eighty damping signal will cause switch 710 to open and system 10 will be underdamped. When the heads 16 are very far off-track, the underdamped condition is necessary to allow the heads to respond quickly and move toward the track. The ninety-six POSM signal is gated with the four hundred eighty damping signal at a NOR gate 720. The system is underdamped during ninety-six TPI position mode.

The velocity compensator 56 is comprised of an inverter 722, a switch 724, a resistor 726, a resistor 728, a resistor 730, a resistor 732, a switch 734, a resistor 736, a switch 738, a resistor 740, a switch 742, a resistor 744, and an amplifier 746. When the system 10 is in a position mode, the switch 734 is closed and the error signal from adder 74 is output as a motor control signal to a point 750. Motor control signal goes to linear motor 62 via power amp 60. Switch 734 is controlled by the velocity/inverse position signal from point 716. If the velocity mode is on, switch 734 is open. The error signal from adder 54 then passes through resistor 736. The error signal is still used in the velocity mode because of the need for biasing from the tilt feature.

When in the velocity mode, switch 742 is closed by an inverse/velocity position signal from an inverter 751. The amplifier 746 then compares the measured velocity signal from point 244 with the desired velocity signal or DAC signal from controller 28 via point 752. The amplifier 746 puts out a motor control signal which trys to keep the measured velocity equal to the desired velocity.

If the velocity mode is seeking a track on a four hundred eighty TPI disk, then switch 724 is kept open. Switch 724 is controlled by a four hundred eighty seek signal sent from controller 28 via a point 753. The DAC signal is then passed through a resistor 728. This allows for lower head speeds when seeking a four hundred eighty TPI track. Switch 738 is closed when a servo enable signal is sent from controller 28 via point 754 and an inverter 755. When switch 738 is closed, the system 10 is disabled.

A switch 760 and a resistor 762 form an off-set network. The off-set feature is used for testing how far off-track heads 16 can be and still read the track. During testing, switch 760 is closed by an off-set enable signal from controller 28 via a line 764. The controller 28 then sends a DAC signal via point 752 through resistor 762 to add to the position signal going to the position compensator 44. By adjusting the DAC signal, the head can be off-set from the on-track position during the position mode.

FIG. 5 shows a schematic of a data track and is designated by the general reference number 800. The data track 800 is shown as viewed from a stationary transducer head 802 as the disk spins. From the vantage point of head 802, the track 800 appears to move in and out twice per revolution. As explained above, this variation in the track is due to misclamping of the disk or imperfections in the disk itself.

The gain circuit 40 of the disk drive system 10 allows the head 802 to compensate for these variations when the disk drive system 10 is operating in the four hundred eighty TPI position mode with a four hundred eighty TPI disk. When the drive 10 is operating in the forty-eight or ninety-six TPI position mode with a forty-eight or ninety-six TPI disk, then a different method is used to overcome the problems caused by these variations. In order to read and write the four hundred eighty TPI tracks, head 802 is necessary only 1/480th of an inch wide. When the drive 10 is reading a forty-eight or ninety-six TPI disk, the tracks on the disk appear much wider than the head 802. The drive 10 can correct for misclamping and imperfections in the disk by positioning head 802 in a band 804. Band 804 represents the fixed position, relative to the carriage arm 18, which remains completely within the boundaries of track 800 for one full revolution of the disk.

The small width of head 804 allows it to be positioned within band 804 such that the head 802 never crosses the boundary of track 800. The head of the present invention is 1/5th the width of a ninety-six TPI track and 1/10th the width of a forty-eight TPI track. Thus, correction for disk misclamping and imperfections can be achieved without the need of moving the head at all once it is within the band 804.

FIGS. 6-9 show a flow chart of a process for determining the optimum position of head 802. The process is designated by the general reference number 850. Process 850 is implemented as firmware in controller 28.

A step 852 is the start of process 850. Process 850 starts when a forty-eight or ninety-six TPI disk has been inserted in system 10. At a step 854, the head is moved to a center track of the disk. For a forty-eight TPI disk, the center track is track twenty. For a ninety-six TPI disk, the center track is track forty. At step 856, values "a" and "b" are set to zero and the head movement direction is set in the inward direction. The value "a" represents the number of identification (ID) fields that can be read from the disk in the location proceeding the peak value. The peak value is the maximum number of ID fields read anywhere during the search. The peak value may be read in more than one microstep position. The value "b" represents the number of ID fields that can be read from the disk in the microstep location immediately following the last location containing a peak number of ID fields.

At a step 858, the head reads the track for one complete revolution and determines the number of ID fields read. A value "P" is set equal to the number of ID fields read and a value "c" is set equal to one at a step 860. Thus, the value "P" represents the number of ID fields read at a previous microstep position. The value "c" represents the number of microstep positions at which a peak value of ID fields can be read. At a step 862, the head is then moved one microstep. Since the direction has already been set inward, the head moves in the inward direction. One microstep is defined in system 10 as the distance equal to one quarter the period of the sine wave generated by the metal scale 46 and the slope selector 48.

At a step 864, the head again reads the track an determines the number of ID fields that can be read. At step 866, a value "N" is set equal to the number of ID fields just read. The value "N" represents the new count of ID fields that can be read. At a step 868, the process determines if "N" is equal to "P". If it is, then the process goes to a point "A". If "N" is not equal to "P" then the process goes to a step 870. At step 870, the process determines if "N" is less than "P". If it is, then the process goes to a point "C" and if it is not, then the process goes to a point "D".

At point "A" the process continues on to a step 872. Here, the value of "c" is set equal to "c" plus 1. At a step 874, the head moves one microstep. Process 850 then goes to a point "B" in FIG. 7.

At point "B" the process goes to a step 880 wherein the track is again read and the number of ID fields detected is determined. At a step 882, the value "N" is set equal to the number of ID fields which have just been read. Next, at a step 884, the value "N" is compared to the value "P". If "N" is equal to "P" then the process returns to point "A" and proceeds again to step 872. If "N" is not equal to "P" then the process goes to a step 886. If "N" is less than "P", then the process goes to point "c" and continues to a step 890. If "N" is not less than "P", then the process goes to a point "D".

At step 890, "a" is set equal to "N" and the head direction is reversed. At a step 892, the head is moved "c" plus one microsteps. At a step 894, the track is again read and the number of identification fields read is determined. The value "N" is set equal to the number of ID fields just read, at a step 896.

At a step 898, the value "N" is compared to the value "P". If "N" is equal to "P", then the process goes to a point "E". If "N" is not equal to "P", then the process goes to a step 900. If at step 900, it is determined that "N" is less than "P", then the process goes to a point "F". If "N" is not less than "P", then the process goes to a point "D".

Turning now to FIG. 8, from point "D" the process goes to a step 910. The value "a" is set equal to "P". The value "c" is set equal to one. The value "P" is then set equal to "N". At a step 912, the head is moved one microstep. At a step 914, the head is read and the number of ID fields read is determine.. At a step 916, "N" is set equal to the number of ID fields just read.

The value "N" is compared to the value "P" at a step 918. If "N" is equal to "P", then the process goes to a point "E". If "N" is not equal to "P", then the process goes to a step 920. At step 920, if it is determined that "N" is less than "P", then the process goes to a point "F". If "N" is not less than "P", then the process returns to point "D".

At point "E", the process continues on to a step 930. The value "c" is set equal to "c" plus one. The head is then moved one microstep at a step 932. At a step 934, the track is read and the number of ID fields read is determined. At a step 936, "N" is set equal to the number of ID fields just read. At a step 938, if "N" is determined to be equal to "P", then the process returns to point "E". If "N" is not equal to "P", then the process goes to a step 940. If "N" is less than "P", then the process goes to point "F". If "N" is not less than "P", then the process goes to point "D".

Turning now to FIG. 9, from point "F", the process goes to a step 950. The value "b" is set equal to "N" and the head movement direction is reversed. At a step 952, the value of "F(c)" is determined. "F(c)" is the number of microsteps needed to move the head to the position where the maximum or peak number of ID fields can be read. If "c" is odd, then "F(c)" equals $(c+1)/2$. If "c" is even and "a" is greater than "b", then "F(c)" equals $(c/2)+1$. If "c" is even and "a" is less than or equal to "b", then "F(c)" equals $c/2$. At a step 954, the head is moved "F(c)" microsteps. The head is now located at the optimum position. At a step 956, the present microstep location is defined as the position of the center track. The position of the center track is used as a reference at a step 958. The controller, by using this position as a reference, and knowing the standard number of microsteps between the tracks, can position the head correctly over all of the other tracks on the disk. The process 850 comes to an end at a step 960.

Returning now to FIG. 5, a plurality of points 1001-1005 represent consecutive microstep positions on data track 800. These positions will be used in the following example of the operation of process 850. The process 850 starts at step 852 and the head is move to the position for the center track. Assume that the original head position is at point 1004 in FIG. 5. At step 856, the values for "a" and "b" are set to zero and the head movement is set in the inward direction. The track is read at step 858. Assume that only eight ID fields were read at position 1004. "P" is then set equal to eight and "c" is set equal to one at step 860. The head is then moved to position 1005 at step 862. The track is read at step 864. Assume that only four ID fields were read at position 1005. "N" is set equal to four at step 866. "N" is less than "P", so at step 870, the process goes to step 890.

At step 890, "a" is set equal to four. The value of "a" is the number of ID fields read at the position proceeding the peak value position. The head movement direction is reversed, so the head will now be moving outward. At step 892, the head moves "c" plus one, or two microsteps outward to position 1003. The track is read at step 894, and assume that fifteen ID fields were read. "N" is set equal to fifteen at step 896. "N" is greater than "P", so the process goes to step 910. The value "a" is set equal to eight, the value of "c" is set equal to one and the value "P" is set equal to fifteen.

The head moves to position 1002 at step 912 and the track is read at step 914. At position 1002, assume that fifteen ID fields are read. "N" is then set equal to fifteen at step 916. "N" equals "P" so the process goes to step 930.

At step 930, "c" is set equal to two. The head is then moved to position 1001 at step 932. The track is read and assume that twelve ID fields were detected. "N" is set equal to twelve. "N" is less than "P" so the process goes to step 950.

At step 950, "b" is set equal to twelve and the head movement direction is reversed, so that the head will now be moving inward. At step 952, "F(c)" is computed. The value "c" is even, "a" is less than "b", so "F(c)" is equal to 2/2 or one. At step 954, the head is moved back to position 1002 which is the best location. Note, even though there are two maximum or peak locations, points 1002 and 1003 where fifteen ID fields are both read, position 1002 is preferrable, since position 1001 had twelve ID fields read compared with only eight at position 1004. At step 956, position 1002 is defined as the location of track 800. This track location is then used as a reference point for determining the position of other tracks on the disk at a step 958.

For most all disks, the process 850, up to step 958, will provide a reference position, within band 804 wherein all of the ID fields of the track can be read. For a forty-eight or ninety-six TPI disk, there are fifteen ID fields per track. However, there may be some disks where there is no optimum position where all of the ID fields on the track can be read.

FIG. 10 shows a schematic of a second disk track as seen from a transducer head and is designated by the general reference number 1050. Track 1050 has an extremely bad problem of misclamping and eccentricity. In this case, there is no band, such as 804 in FIG. 5, where a head 1052 can be located to read all of the ID fields. Process 850 selects the optimum position for head 1052 as being a line 1054. At a number of points, 1056, 1058, 1060 and 1062, the head 1052 may be unable to read the data blocks. For example, if the head 1052 is located at line 1054, then only eleven out of the fifteen ID fields may be read.

Another problem which may be encountered with extremely bad disks occurs when they have been repeatedly written and rewritten upon. Sometimes after many rewrites, the data field becomes shifted relative to the ID field. Even though the head may be in the correct position to read the ID field for a desired block, the head may not be able to read the data field for that block. In order to overcome these two problems, the process 850 has some additional steps.

FIG. 11 shows a flow chart of a fifth portion of process 850. From step 958, the process 850 proceeds to a step 1100. Here, the head is positioned on a track containing the desired block to be read. The reference track location is used to find the optimum position of this track. Next, at a step 1102, an attempt is made to read the desired block. At a step 1104, it is determined if the block was read or if an error was detected. If an error was not detected, then the process stops at a step 1106. If an error was detected, then the head moves one microstep inward at a step 1108. The block is again read at a step 1110. At a step 1112, it is determined if an error was detected. If an error was not detected, then the program moves the head one mirostep outward at a step 1114 to return the head to the original starting position. The process then stops at a step 1115. If an error was detected, then the head is moved two microsteps outward at a step 1116.

At step 1116, the head is moved two microsteps outward and at a step 1118, the block is read. At a step 1120 it is determined if an error was detected. If no error was detected, then the process 850 moves the head one microstep inward at a step 1122 to return the head to the original starting position. The process then stops at a step 1123. If an error was detected, then the head is moved one microstep inward at a step 1124. This returns the head to its original optimal position. The process then indicates an error to the computer at a step 1126 and the process stops at a step 1127.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. A process for optimizing head position to compensate for disk misclamping and imperfections comprising the steps of:
  i. moving a transducer head to a track position on a disk, said head having a width less than a track width;
  ii. repeatedly reading said track and microstepping the head in a first direction across said track until a number of identification fields detected at a present microstep position is less than a number of identification fields detected at a preceding microstep position;
  iii. defining the preceding microstep position as a current maximum position;
  iv. moving the head to a microstep position on the other side of the maximum position and reading a number of identification fields of the track;
  v. if the number of identification fields read in step (iv) is less than a number of identification fields detected at the current maximum position, then defining the current maximum position as a reference position and terminating the process;
  vi. if the number of identification fields read in step (iv) is greater or equal than a number of identification fields detected at the current maximum position, then repeatedly reading said track and microstepping the head in a second direction across said disk until a number of identification fields detected at a present microstep position is less than a number of identification fields detected at a preceding microstep position; and
  vii. defining the preceding microstep position as a reference microstep position for said track.

2. The process of claim 1 wherein, said track is a center track of the disk.

3. The process of claim 1 further comprising the steps of:
  viii. using said reference microstep position for said track as a reference position for positioning the head on other tracks of the disk.

4. A process for optimizing head position to compensate for disk misclamping and imperfections comprising the steps of:
  i. moving a transducer head to a track position on a disk, said head having a width less than a track width;
  ii. repeatedly reading said track at different microstep positions;
  iii. determining a number of identification fields detected at each microstep position;

iv. if an odd number of microstep positions have a maximum number of identification fields detected, then finding the optimum position as the middle one of said odd number of microstep positions; and v. if an even number of microstep positions have a maximum number of identification fields detected, then defining said microstep positions as maximum positions and determining which one of a couple of boundary microstep positions located one microstep on either side of said maximum positions has a greater number of identification fields detected, and defining the optimum microstep position as one of the two middle most of said maximum microstep positions which is closest to the boundary position having the greatest number of identification fields detected.

5. The process of claim 4 wherein, said track position is a center track position.

6. The process of claim 4 further comprising the step of:

vi. using said optimum microstep position as a reference position for positioning the head on other tracks of the disk.

7. A process for optimizing head position to compensate for disk misclamping and imperfections comprising the steps of:

i. moving a transducer head to a track position on a disk, said head having a width less than a track width;

ii. reading said track and determining a number of identification (ID) fields detected, defining a previous number of ID fields detected (P) as being equal to the number of ID fields detected, and defining a number of microstep positions having a maximum number of ID fields (c) as being equal to one;

iii. setting said head movement in a first direction and moving said head one microstep;

iv. reading said track and determining a number of ID fields detected and defining a current number of ID fields detected (N) as being equal to the number of ID fields just detected;

v. if N equal P, then proceeding to a step (viii);

vi. if N is less than P, then proceeding to a step (xii);

vii. if N is greater than P, then proceeding to a step (xvi);

viii. setting (c) equal to (c+1), moving said head one microstep, reading said track and setting N equal to a number of identification fields detected;

ix. if N equal P, then returning to step (viii);

x. if N is less than P, then proceeding to a step (xii);

xi. if N is greater than P, then proceeding to a step (xvi);

xii. setting the number of ID fields detected at a first boundary position (a) equal to N, reversing the direction of head movement, moving said head a number of microsteps equal to (c+1), reading said track and setting N equal to a number of ID fields detected;

xiii. if N equals P, then proceeding to a step (xx);

xiv. if N is less than P, then proceeding to a step (xxiv);

xv. if N is greater than P, then proceeding to a step (xvi);

xvi. setting (a) equal to P, setting (c) equal to one, setting P equal N, moving said head one microstep, reading said track and setting N equal to a number of ID fields detected;

xvii. if N equals P, then proceeding to a step (xx);

xviii. if N is less than P, then proceeding to a step (xxiv);

xix. if N is greater than P, then returning to step (xvi);

xx. setting (c) equal to (c+1), moving said head one microstep, reading said track and setting N equal to a number of ID fields detected;

xxi. if N equals P, then returning to step (xx);

xxii. if N is less than P, then proceeding to a step (xxiv);

xxiii. if N is greater than P, then returning to step (xvi);

xxiv. setting a number of ID fields detected at a second boundary position (b) equal to N and reversing the direction of head movement;

xxv. if (c) is odd, then moving the head a number of microsteps equal to (c+1)/2;

xxvi. if (c) is even, and (a) is greater than (b), then moving the head a number of microsteps equal to (c/2)+1;

xxvii. if (c) is even, and (a) is less than or equal to (b), then moving the head a number of microsteps equal to c/2.

8. The process of claim 7 further comprising the step of:

xxviii. defining the present microstep position as the optimum position of said track.

9. The process of claim 8 further comprising the step of:

xxix. using said optimum position of said track as a reference position for calculating the position of other tracks.

10. The process of claim 9 further comprising the steps of:

xxx. moving said head to a position of a track containing a block of data which is to be read;

xxxi. reading said block and determining if an error was detected;

xxxii. if an error was detected at step xxxi, then moving said head one microstep in a first direction;

xxxiii. reading said block and determining if an error was detected;

xxxiv. if an error was detected at step xxxiii, then moving said head two microsteps in a direction opposite to that of the first direction; and xxxv. reading said block.

11. The process of claim 7 wherein, said track is a middle track of said disk.

* * * * *